United States Patent
Choi et al.

(10) Patent No.: US 10,002,262 B2
(45) Date of Patent: Jun. 19, 2018

(54) DEVICE AND METHOD FOR GENERATING IDENTIFICATION KEY BY USING SEMICONDUCTOR PROCESS

(71) Applicant: ICTK CO., LTD., Gyeonggi-do (KR)

(72) Inventors: Byong Deok Choi, Seoul (KR); Dong Kyue Kim, Seoul (KR)

(73) Assignee: ICTK CO., LTD., Gyeonggi-do (KR)

( * ) Notice: Subject to any disclaimer, the term of this patent is extended or adjusted under 35 U.S.C. 154(b) by 165 days.

(21) Appl. No.: 15/025,191

(22) PCT Filed: Feb. 19, 2014

(86) PCT No.: PCT/KR2014/001320
§ 371 (c)(1),
(2) Date: Mar. 25, 2016

(87) PCT Pub. No.: WO2015/046682
PCT Pub. Date: Apr. 2, 2015

(65) Prior Publication Data
US 2016/0239684 A1    Aug. 18, 2016

(30) Foreign Application Priority Data
Sep. 30, 2013    (KR) .................. 10-2013-0116424

(51) Int. Cl.
*G06F 21/00*    (2013.01)
*G06F 21/73*    (2013.01)
(Continued)

(52) U.S. Cl.
CPC .............. *G06F 21/73* (2013.01); *G09C 1/00* (2013.01); *H01L 21/823475* (2013.01);
(Continued)

(58) Field of Classification Search
CPC ..................................................... G06F 21/73
(Continued)

(56) References Cited

U.S. PATENT DOCUMENTS

2004/0136529 A1* 7/2004 Rhelimi ............... G06F 7/588
380/44
2005/0268174 A1   12/2005 Kumagai
(Continued)

FOREIGN PATENT DOCUMENTS

EP    3043281 A1    7/2016
JP    3804670 B2    8/2006
(Continued)

OTHER PUBLICATIONS

Nedospasov, D. et al., "Invasive PUF Analysis," Proceedings of the 2013 Workshop on Fault Diagnosis and Tolerance in Cryptography (FDTC '13), Aug. 20, 2013, Santa Barbara, California, 9 pages.
(Continued)

*Primary Examiner* — Harris C Wang
(74) *Attorney, Agent, or Firm* — McCoy Russell LLP

(57) ABSTRACT

Provided are a device and a method for generating an identification key by using a process variation in a semiconductor process. A semiconductor is manufactured by adjusting a gate side edge position of a contact such that a difference between a probability that a gate of a transistor is shorted from a drain or a source by the contact and a probability that the gate is not shorted is less than or equal to a predetermined threshold. When the manufactured semiconductor does not have a separate process, whether there is a short circuit between the gate and the drain or the source is stochastically generated by the process variation, whether there is a short circuit is detected through a reader, and an identification key is provided.

13 Claims, 6 Drawing Sheets

(51) Int. Cl.
*H01L 21/8234* (2006.01)
*H01L 27/06* (2006.01)
*H04L 9/08* (2006.01)
*G09C 1/00* (2006.01)

(52) U.S. Cl.
CPC ........ *H01L 27/0629* (2013.01); *H04L 9/0866* (2013.01); *H04L 2209/12* (2013.01)

(58) Field of Classification Search
USPC .............................................................. 726/3
See application file for complete search history.

(56) References Cited

U.S. PATENT DOCUMENTS

| | | | |
|---|---|---|---|
| 2010/0070777 A1 | 3/2010 | Salters et al. | |
| 2013/0101114 A1* | 4/2013 | Kim | G06F 21/73 380/44 |
| 2013/0322624 A1* | 12/2013 | Kim | H04L 9/002 380/44 |
| 2014/0310515 A1* | 10/2014 | Kim | H04L 9/321 713/155 |
| 2015/0084193 A1* | 3/2015 | Feng | H01L 23/535 257/741 |
| 2015/0222430 A1* | 8/2015 | Kim | H04L 9/0866 380/44 |
| 2016/0170856 A1* | 6/2016 | Kim | G09C 1/00 702/182 |
| 2016/0239684 A1* | 8/2016 | Choi | G06F 21/73 |

FOREIGN PATENT DOCUMENTS

| | | |
|---|---|---|
| KR | 1020090068987 A | 6/2009 |
| KR | 101139630 B1 | 5/2012 |
| KR | 1020120089607 A | 8/2012 |
| WO | 2011088074 A2 | 7/2011 |
| WO | 2012133965 A1 | 10/2012 |

OTHER PUBLICATIONS

ISA Korean Intellectual Property Office, International Search Report Issued in Application No. PCT/KR2014/001320, dated Jun. 20, 2014, WIPO, 4 pages.

* cited by examiner

US 10,002,262 B2

DEVICE AND METHOD FOR GENERATING IDENTIFICATION KEY BY USING SEMICONDUCTOR PROCESS

CROSS REFERENCE TO RELATED APPLICATIONS

The present application is a U.S. National Phase of International Patent Application Serial No. PCT/KR2014/001320, entitled "DEVICE AND METHOD FOR GENERATING IDENTIFICATION KEY BY USING SEMICONDUCTOR PROCESS," filed on Feb. 19, 2014, which claims priority to Korean Patent Application No. 10-2013-0116424, entitled "DEVICE AND METHOD FOR GENERATING IDENTIFICATION KEY BY USING SEMICONDUCTOR PROCESS," filed on Sep. 30, 2013, the entire contents of each of which are hereby incorporated by reference for all purposes.

TECHNICAL FIELD

The following description relates to a device and method for generating an identification key for hardware security, and more particularly, to a device and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physically unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an interlayer contact or a via is formed between conductive layers of a semiconductor based on a semiconductor process variation.

DISCLOSURE OF INVENTION

Technical Solutions

According to an aspect of the present invention, there is provided a device for generating an identification key, the device including a transistor included in a semiconductor chip, a contact formed on the transistor, an edge of the contact in a side facing a gate of the transistor being positioned so that a difference between a probability that the gate is shorted to a drain or a source by the contact and a probability that the gate is not shorted to the drain or the source is equal to or less than a predetermined threshold, and a reader configured to determine whether the gate is shorted to the drain or the source by the contact and to generate an identification key.

A position of the edge may be different from a position of an edge in a side facing a gate based on a design rule that ensures that the gate is not shorted to the drain or the source by the contact.

Whether the gate is shorted to the drain or the source may be randomly determined based on a process variation in a process of manufacturing the semiconductor chip.

The edge may be spaced apart from a boundary between the gate and the drain or a boundary between the gate and the source by a distance equal to or greater than a first threshold distance and equal to or less than a second threshold distance.

The first threshold distance may correspond to a minimum value of a distance guaranteeing that the difference between the probability that the gate is shorted to the drain or the source and the probability that the gate is not shorted to the drain or the source is equal to or less than the threshold, and the second threshold distance may correspond to a maximum value of the distance guaranteeing that the difference between the probability that the gate is shorted to the drain or the source and the probability that the gate is not shorted to the drain or the source is equal to or less than the threshold.

The edge may be in a different position from a position designed in a layout of the semiconductor chip so that the difference between the probability that the gate is shorted to the drain or the source by the contact and the probability that the gate is not shorted to the drain or the source may be equal to or less than the predetermined threshold.

According to another aspect of the present invention, there is provided a method of designing a device for generating an identification key, the method including disposing a transistor in a design layout of a semiconductor chip, disposing a contact in the layout, the contact being formed on the transistor, and an edge of the contact in a side facing a gate of the transistor being positioned so that a difference between a probability that the gate is shorted to a drain or a source by the contact and a probability that the gate is not shorted to the drain or the source is equal to or less than a predetermined threshold, and disposing a reader in the layout, the reader being configured to determine whether the gate is shorted to the drain or the source by the contact and to generate an identification key.

A position of the edge may be different from a position of an edge in a side facing a gate based on a design rule that ensures that the gate is not shorted to the drain or the source by the contact.

Whether the gate is shorted to the drain or the source may be randomly determined based on a process variation in a process of manufacturing the semiconductor chip based on the layout.

According to another aspect of the present invention, there is provided a method of manufacturing a device for generating an identification key, the method including forming a transistor on a semiconductor wafer, forming a contact on the transistor, an edge of the contact in a side facing a gate of the transistor being positioned so that a difference between a probability that the gate is shorted to a drain or a source by the contact and a probability that the gate is not shorted to the drain or the source is equal to or less than a predetermined threshold, and forming a reader, the reader being configured to determine whether the gate is shorted to the drain or the source by the contact and to generate an identification key.

A position of the edge may be different from a position of an edge in a side facing a gate based on a design rule that ensures that the gate is not shorted to the drain or the source by the contact.

The forming of the contact may include disposing the contact in a different position from a position designed in a layout of a semiconductor chip so that the difference between the probability that the gate is shorted to the drain or the source by the contact and the probability that the gate is not shorted to the drain or the source is equal to or less than the predetermined threshold.

Whether the gate is shorted to the drain or the source may be randomly determined based on a process variation in a process of manufacturing a semiconductor chip.

According to another aspect of the present invention, there is provided a method of generating an identification key, the method including reading whether a gate of a transistor included in a semiconductor chip is shorted to a drain or a source by a contact, the contact being formed on the transistor, and an edge of the contact in a side facing the gate being positioned so that a difference between a probability that the gate is shorted to the drain or the source by the contact and a probability that the gate is not shorted to the drain or the source is equal to or less than a predetermined threshold, and identifying a result of the reading and providing an identification key corresponding to the transistor.

A position of the edge may be different from a position of an edge in a side facing a gate based on a design rule that ensures that the gate is not shorted to the drain or the source by the contact.

The edge may be spaced apart from a boundary between the gate and the drain or a boundary between the gate and the source by a distance equal to or greater than a first threshold distance and equal to or less than a second threshold distance.

The first threshold distance may correspond to a minimum value of a distance guaranteeing that the difference between the probability that the gate is shorted to the drain or the source and the probability that the gate is not shorted to the drain or the source is equal to or less than the threshold, and the second threshold distance may correspond to a maximum value of the distance guaranteeing that the difference between the probability that the gate is shorted to the drain or the source and the probability that the gate is not shorted to the drain or the source is equal to or less than the threshold.

Whether the gate is shorted to the drain or the source may be randomly determined based on a process variation in a process of manufacturing the semiconductor chip.

The edge may be in a different position from a position designed in a layout of the semiconductor chip so that the difference between the probability that the gate is shorted to the drain or the source by the contact and the probability that the gate is not shorted to the drain or the source may be equal to or less than the predetermined threshold.

BEST MODE FOR CARRYING OUT THE INVENTION

Figure 1:
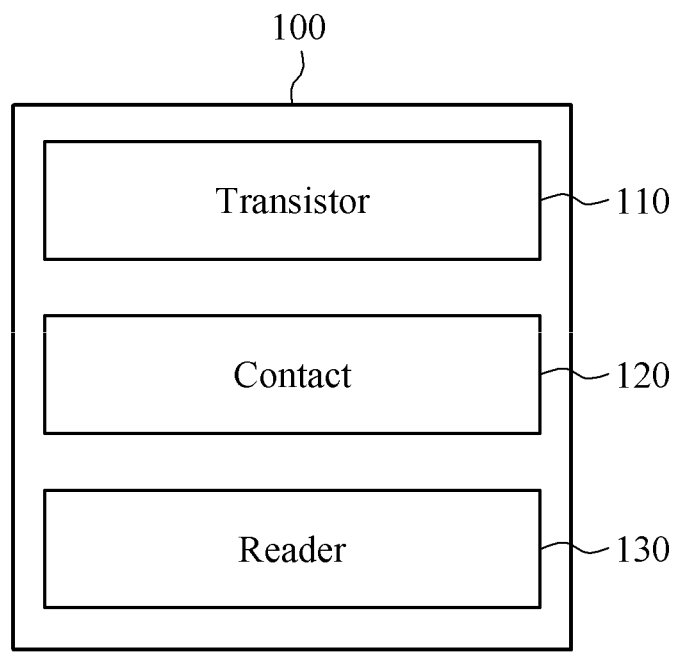
FIG. 1 is a block diagram illustrating a device for generating an identification key according to an embodiment.

Hereinafter, some embodiments will be described in detail with reference to the accompanying drawings. The inventive concept, however, should not be construed as limited to the embodiments set forth herein. Like reference numerals in the drawings refer to like elements throughout the present disclosure.

FIG. 1 is a block diagram illustrating a device 100 for generating an identification key according to an embodiment.

The device 100 may include a transistor 110, a contact 120 and a reader 130.

The transistor 100 may be, for example, either an N-channel metal oxide semiconductor (NMOS) or a P-channel metal oxide semiconductor (PMOS). Accordingly, the transistor 100 may include a gate, a drain and a source.

A metal-oxide-semiconductor field-effect transistor (MOSFET), for example, an NMOS or a PMOS, is merely an example of the transistor 100. Accordingly, the transistor 100 may be, for example, a junction gate field-effect transistor (JFET) or a bipolar junction transistor (BJT). Also, the present disclosure should be understood to be applicable to a diode as well as a transistor and not be limited to a portion of a configuration described as an example in the specification.

Typically, an operation region of an NMOS may be classified into three regions, for example, a cut-off range, a triode region and a saturation region. The same operation principle may also be applicable to a PMOS, and accordingly description will be provided based on the NMOS.

In the cut-off region, a gate voltage of the NMOS may be less than a threshold voltage $V_{th}$. The NMOS may operate when the gate voltage is equal to or greater than a threshold voltage, and accordingly a drain-source voltage may not have an influence on a flow of a current.

In the triode region, the gate voltage of the NMOS may be greater than the threshold voltage, and accordingly a current may flow. However, because a drain current is not yet saturated in the triode region, both a gate-source voltage $V_{gs}$ and a drain-source voltage $V_{ds}$ may have an influence on the drain current.

In the saturation region, the gate voltage of the NMOS may also be greater than the threshold voltage, and accordingly a current may flow. In the saturation region, the drain current may be affected by only the gate voltage, regardless of a drain voltage. When the NMOS enters the saturation region, the drain current may become constant. When a gate-drain voltage becomes equal to the threshold voltage in a state in which a channel is formed, the channel may disappear in the vicinity of a drain, and thus the drain voltage may not affect a change in the drain current. In the saturation region, a condition of $V_{ds} > V_{gs} - V_{th}$ may be satisfied.

For example, a contact may be formed to overlap a gate and a drain (or a source) by a design or a process variation. In this example, the gate and the drain (or the source) may be, for example, in a state in which the gate and the drain (or the source) are shorted.

Throughout the present specification, the contact may refer to an arbitrary conductive element to short a gate and a drain (or a source) of a transistor. The contact may include a conductive element, for example, a via formed to connect conductive layers, or a contact formed to connect a conductive layer and an active region.

Accordingly, the contact should be understood to have an arbitrary shape to short a gate and a drain (or a source) in a transistor, and not be limited to a portion of a configuration described as an example in the specification.

For example, when a gate and a drain are shorted, an NMOS may satisfy the condition of $V_{ds} > V_{gs} - V_{th}$ for the saturation region at all times. Accordingly, the NMOS may operate in the saturation region at all times. In other words, only a magnitude of a flowing current may be affected by a gate voltage, and even though a drain-source voltage increases at the same gate voltage, the magnitude of the flowing current may remain unchanged, which may be referred to as diode-connected.

According to a typical design rule that ensures that a gate and a drain are not shorted, forming of a contact to overlap the gate and the drain (or a source) may not be allowed. The design rule may be a design rule that ensures that a contact is formed in one of a gate, a drain and a source and the gate is not shorted to the drain or the source in a transistor. Hereinafter, unless otherwise stated, the design rule will be understood as described above.

In other words, because the gate and the drain (or the source) are not shorted, a current of the transistor may flow based on a voltage applied to each of the gate and the drain.

On the contrary, instead of applying the typical design rule, the contact may be formed to randomly overlap the gate and the drain (or the source) by adjusting a position of the contact in a design and/or a manufacturing process.

When the contact is formed to overlap the gate and the drain (or the source), the gate and the drain (or the source) may be shorted. Accordingly, the NMOS may operate in the saturation region at all times, and the magnitude of the current may change based on the gate voltage. However, the magnitude of the current may remain constant at all times regardless of a drain voltage.

In a typical semiconductor process, the above result may be determined as a process failure. Also, the gate and the drain (or the source) may be shorted, and accordingly a semiconductor may be determined as a defective product.

However, by the above process failure (that is, a phenomenon recognized as a failure in a typical semiconductor manufacturing process), an unpredictable short circuit phenomenon may occur between the gate and the drain (or the source). A physical unclonable function (PUF) may be generated based on a result of the above random short circuit phenomenon.

The above random process failure may be caused by impossibility to independently control a gate voltage and a drain voltage due to a short circuit between the gate and the drain (or the source).

As described above, by forming the contact to overlap the gate and the drain (or the source), the gate and the drain (or the source) may be shorted. However, whether the gate and the drain (or the source) are shorted may not be predicted, which may guarantee randomness of a digital value generated by the PUF.

When a separate process is not performed after a semiconductor manufacturing process is performed, whether a short circuit occurs determined in the manufacturing process may be maintained with a change. Thus, time-invariance of a digital value generated by the PUF may be guaranteed at a high level.

Furthermore, even though a semiconductor is manufactured based on the same process parameter, for example, a position of an edge of a contact in a side facing a gate, and the like, a process error of a predetermined level may be inevitable. Also, because a behavior and occurrence of the process error may be controlled within a predetermined range, whether a gate and a drain (or a source) of a transistor in each of manufactured semiconductors may be determined for each of the semiconductors.

Accordingly, because different digital values are generated despite use of the same process parameter, a characteristic of the PUF, that is, a physical unclonability may be satisfied.

According to embodiments, in a design and/or a manufacturing process of a semiconductor, a contact between a transistor and a conductive layer may be formed by changing a position of a window included in the conductive layer, and thus whether a gate and a drain (or a source) are shorted may be randomly determined. By the above randomness, a PUF may be generated.

However, a change in a position of an edge of a contact that is included in the conductive layer and that is in a side facing a gate is merely an example among semiconductor process parameters to short the gate and a drain (or a source). Accordingly, the change should be understood to include a change in an arbitrary process parameter to short a gate and a drain (or a source), and not be limited to a portion of a configuration described as an example in the specification.

The reader 130 may determine whether a gate and a drain (or a source) of a manufactured transistor are shorted, and may provide an identification key as an output value.

In an example, when an NMOS transistor is manufactured, a read-out circuit may be formed and whether a gate and a drain (or a source) are shorted may be determined based on an output value. Also, a value of "0" or "1" may be output as an output value, and an identification key may be provided.

In another example, when a PMOS transistor is manufactured, a read-out circuit may be formed and whether a gate and a drain (or a source) are shorted may be determined based on an output value. Also, a value of "0" or "1" may be output as an output value, and an identification key may be provided.

As described above, the reader 130 may include a MOSFET, for example, an NMOS or a PMOS, however, this is merely an example. Accordingly, the reader 130 should be understood to include a transistor, for example, a JFET or a BJT, or a diode, and not be limited to a portion of a configuration described as an example in the specification.

Hereinafter, a structure of a contact formed on a transistor based on a typical process parameter according to various embodiments will be further described.

Figure 2:
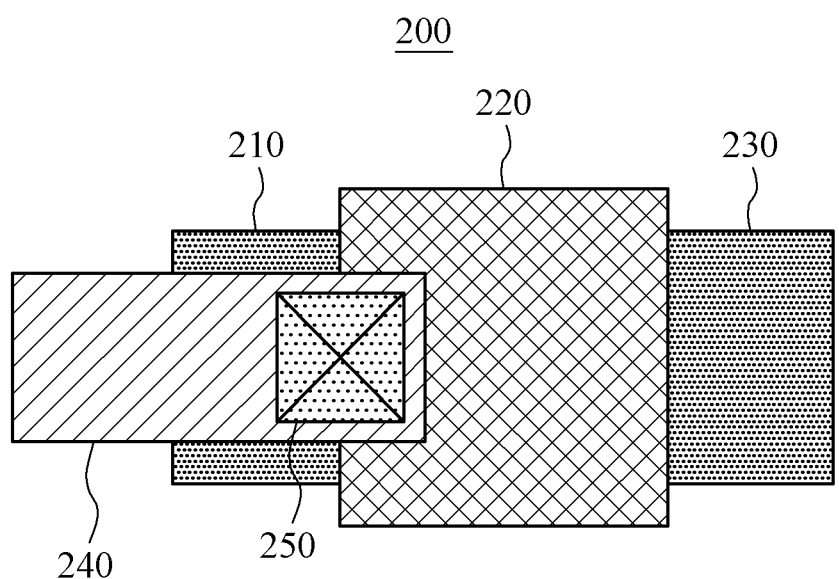
FIG. 2 is a top view illustrating a contact and a transistor according to an embodiment.

FIG. 2 is a top view 200 illustrating a contact and a transistor according to an embodiment.

The top view 200 shows a transistor that includes a drain 210, a gate 220 and a source 230. Also, a conductive layer 240 and a contact 250 are shown.

According to a typical design rule, the contact 250 may be designed to be formed not to overlap the gate 220 and the drain 210 (or the source 230). This is because the typical design rule does not allow that the contact 250 overlaps the drain 210 and the gate 220 so as to short the drain 210 and the gate 220.

Accordingly, according to the typical design rule, the contact 250 may be formed in one of the drain 210, the gate 220 and the source 230. Thus, the gate 220 and the drain 210 (or the source 230) may not be shorted, and the transistor may operate based on a typical transistor operation principle.

Unlike the typical design rule, according to an embodiment, the contact 250 may be formed to overlap the gate 220 and the drain 210 (or the source 230) in a design and/or process.

When the contact 250 overlaps the gate 220 and the drain 210 (or the source 230), whether the gate 220 and the drain 210 (or the source 230) are shorted may be randomly determined.

Also, an edge of the contact 250 in a side facing the gate 220 may be positioned so that a difference between a probability that the gate 220 is shorted to the drain 210 or the source 230 by the contact and a probability that the gate 220 is not shorted to the drain 210 or the source 230 may be within a predetermined error range.

As described above, because whether the gate 220 and the drain 210 (or the source 230) are shorted is randomly determined, randomness of a digital value generated by a PUF may be guaranteed.

Also, whether the gate 220 and the drain 210 (or the source 230) are shorted may remain unchanged unless a separate process is performed after the transistor is manufactured. Thus, time-invariance may also be guaranteed and the transistor may be used to generate a PUF.

A position of an edge of a contact in a side facing a gate may be adjusted during a semiconductor design process. However, this is merely an example, and it is possible to create the same result through an operation in a semiconductor process even though a design corresponds to a typical transistor. Accordingly, even though description of a portion of a design or a manufacturing process is provided below, it should be understood that there is no limitation to some embodiments by the description.

Hereinafter, a structure in an example in which the gate 220 and the drain 210 (or the source 230) are shorted and a structure in an example in which the gate 220 and the drain 210 (or the source 230) are not shorted will be further described with reference to FIGS. 3 and 4.

Figure 3:
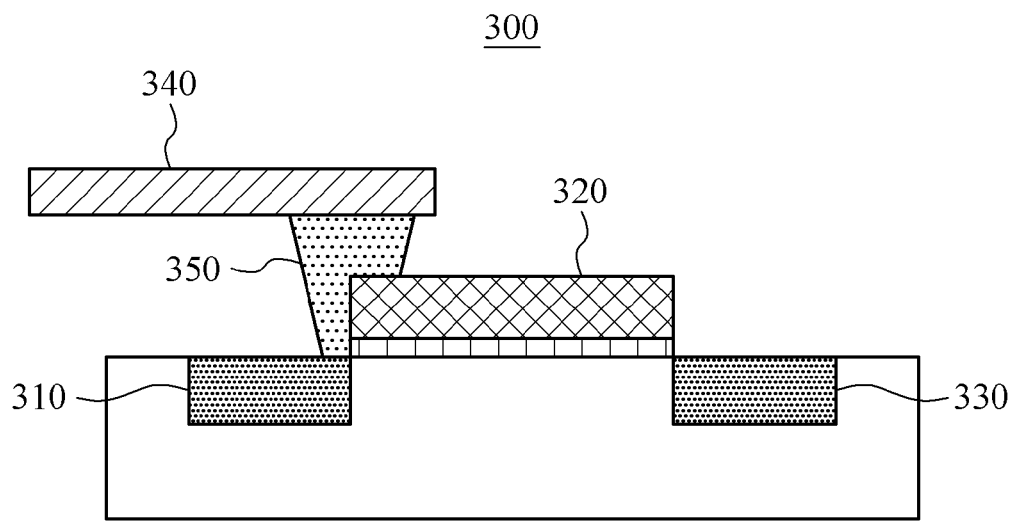
FIG. 3 is a cross-sectional view of a transistor in an example in which a gate and a drain (or a source) are shorted by a contact according to an embodiment.

FIG. 3 is a cross-sectional view 300 of a transistor in an example in which a gate and a drain (or a source) are shorted by a contact according to an embodiment.

In FIG. 3, a gate 320 and a drain 310 may be shorted by a contact 350. When the contact 350 is formed as shown in FIG. 3, the gate 320 and the drain 310 may be shorted.

When the gate 320 and the drain 310 are shorted, the transistor may operate in a saturation region. Accordingly, when a voltage equal to or greater than a threshold voltage is supplied to the gate, a magnitude of a current may remain unchanged regardless of a gate voltage.

Similarly, the contact 350 may be formed to overlap the gate 320 and a source 330, although not shown. However, when the contact 350 is formed to overlap the gate 320 and the source 330 and the gate 320 and the source 330 are shorted, the transistor 300 may be turned off.

Figure 4:
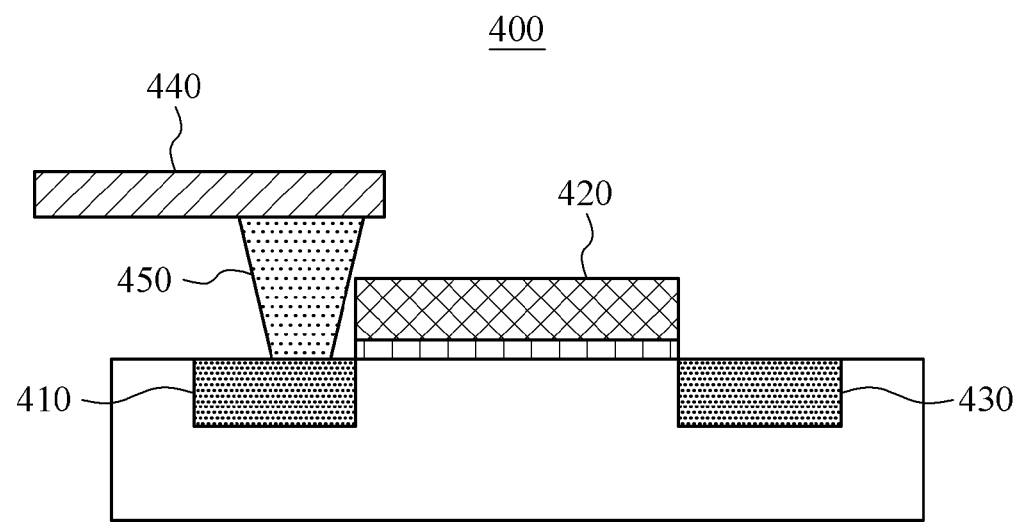
FIG. 4 is a cross-sectional view of a transistor in an example in which a gate and a drain are not shorted by a contact according to an embodiment.

FIG. 4 is a cross-sectional view 400 of a transistor in an example in which a gate and a drain (or a source) are not shorted by a contact according to an embodiment.

In FIG. 4, a gate 420 and a drain 410 may not be shorted by a contact 450. When the contact 450 is formed as shown in FIG. 4, the gate 420 and the drain 410 may not be shorted.

In addition to when a transistor is manufactured based on a typical design rule that ensures that a gate and a drain are not shorted, when the contact 450 is positioned in a boundary between two regions by adjusting a design, the contact 450 may not overlap the two regions.

This is because a process variation occurs in a portion of a semiconductor process, and it is impossible to control the process variation beyond a predetermined level. The contact 450 may be formed not to overlap the gate 420 and the drain 410 by the process variation, and accordingly the gate 420 and the drain 410 may not be shorted.

Similarly, the contact 450 may be formed not to overlap the gate 420 and a source 430, although not shown. When the contact 350 does not overlap the gate 320 and the source 330 and the gate 320 and the source 330 are not shorted, an operation of the transistor 300 may be determined based on a voltage of a gate and a source.

When the gate 420 and the drain 410 (or the source 430) are not shorted as described above, the transistor may operate in the same manner as a transistor designed and/or manufactured based on the typical design rule.

As described above with reference to FIGS. 3 and 4, when a contact is formed to overlap two regions based on a process variation in a process by violating a design rule that ensures that a gate and a drain are not shorted, whether the two regions are shorted by the contact may be randomly determined.

Accordingly, whether the two regions are shorted by the contact may be randomly determined, and thus randomness of a digital value generated by a PUF may be guaranteed.

Also, whether the two regions are shorted may remain unchanged unless a separate process is performed after manufacturing is completed. Thus, time-invariance may also be guaranteed and a transistor may be used to generate a PUF.

Hereinafter, an operation and a circuit to provide an identification key by determining whether a gate and a drain (or a source) are shorted will be further described.

Figure 5:
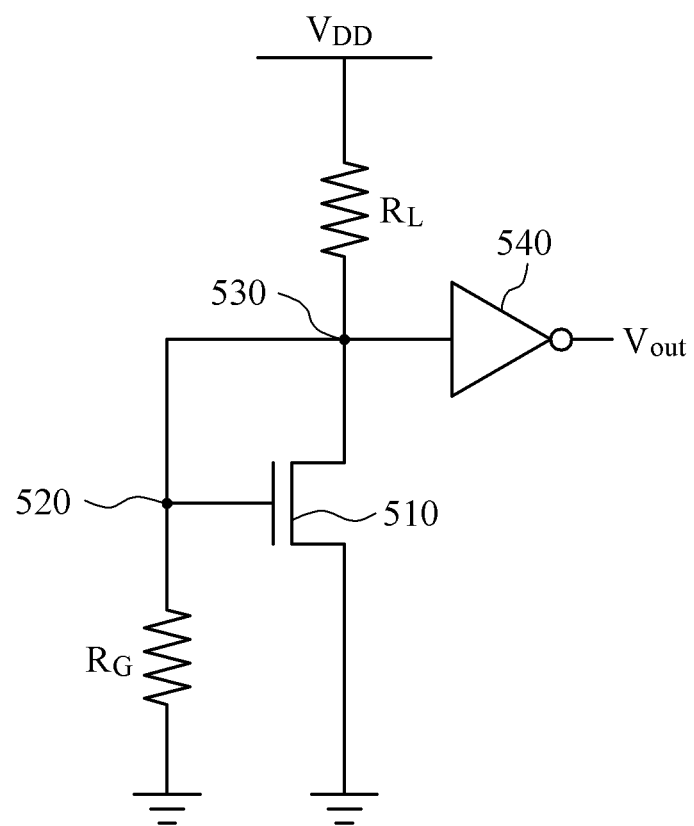
FIG. 5 is a diagram illustrating a read-out circuit of a device for generating an identification key in an example in which a gate and a drain (or a source) are shorted by a contact according to an embodiment.

FIG. 5 is a diagram illustrating a read-out circuit of a device for generating an identification key in an example in which a gate and a drain (or a source) are shorted by a contact according to an embodiment.

A read-out circuit 500 of a device for generating an identification key in an example in which a gate node 520 and a drain node 530 are shorted by a contact may include an NMOS 510, an inverter 540, a gate bias resistor $R_G$ and a load resistor $R_L$.

FIG. 5 illustrates the read-out circuit 500 in the example in which the gate node 520 and the drain node 530 are shorted. In this example, the gate bias resistor $R_G$ together with the load resistor $R_L$ may distribute a voltage $V_{DD}$. The distributed voltage may be applied to the gate node 520 of the NMOS 510, and the voltage applied to the gate node 520 may be designed to be equal to or greater than a threshold voltage of a transistor.

This is because a constant current may flow only when a gate voltage is equal to or greater than the threshold voltage even though the NMOS operates in a saturation region due to a short circuit between the gate node 520 and the drain node 530.

For example, when a voltage equal to or greater than the threshold voltage of the transistor is applied to the gate node 520, the NMOS 510 may operate in the saturation region due to a short circuit between the gate node 520 and the drain node 530. Thus, a constant current may flow in the NMOS 510.

In this example, a voltage of the drain node 530 may be determined by a current flowing in the load resistor $R_L$. The load resistor $R_L$, the gate bias resistor $R_G$ and the NMOS 510 may be designed so that the voltage of the drain node 530 may be less than a logic threshold voltage of the inverter 540. The voltage of the drain node 530 may be input to the inverter 540, and accordingly an output $V_{OUT}$ of the read-out circuit may be "1."

As described above, a short circuit between a gate and a drain in an NMOS may be identified based on an output value, and an output value of "1" may be provided as an identification key.

Figure 6:
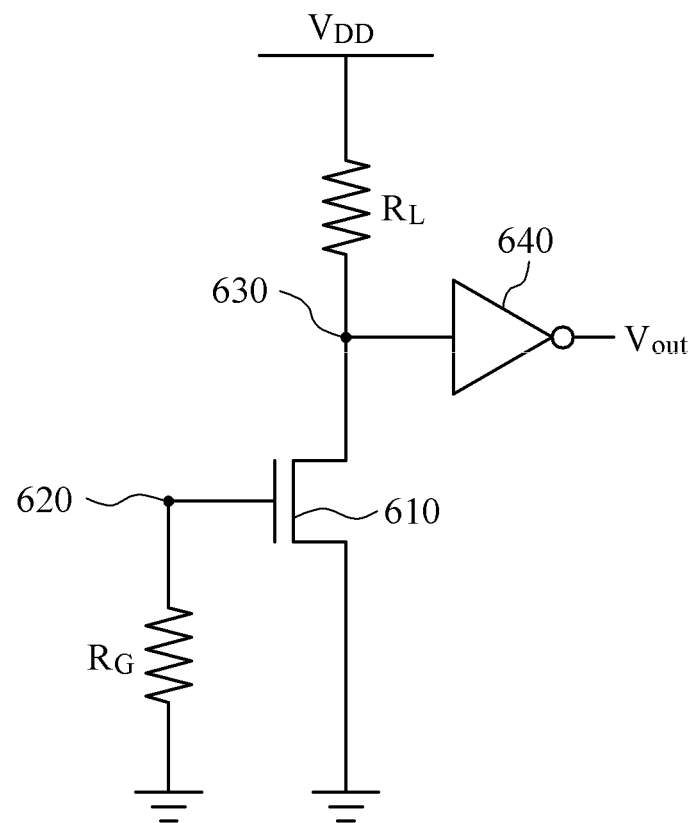
FIG. 6 is a diagram illustrating a read-out circuit of a device for generating an identification key in an example in which a gate and a drain (or a source) are not shorted by a contact according to an embodiment.

FIG. 6 is a diagram illustrating a read-out circuit of a device for generating an identification key in an example in which a gate and a drain are not shorted by a contact according to an embodiment.

A read-out circuit 600 of a device for generating an identification key in an example in which a gate node 620 and a drain node 630 are not shorted by a contact may include an NMOS 610, an inverter 640, a gate bias resistor $R_G$ and a load resistor $R_L$.

FIG. 6 illustrates the read-out circuit 600 in the example in which the gate node 620 and the drain node 630 are not shorted. In this example, a voltage $V_{DD}$ may not be distributed by the gate bias resistor $R_G$ together with the load resistor $R_L$, and the gate node 620 may be biased to a ground.

Accordingly, a current may not flow to the NMOS, and a voltage of the drain node 630 may become equal to $V_{DD}$. The voltage of the drain node 630 may be applied as an input of the inverter 640, and thus an output $V_{OUT}$ of the read-out circuit may be "0."

As described above, an example in which a gate and a drain are not shorted in an NMOS may be identified based on an output value, and an output value of "0" may be provided as an identification key.

As described above with reference to FIGS. 5 and 6, a reader may determine whether a gate and a drain in an NMOS are shorted, and may provide an identification key through an inverter.

Also, the reader may determine whether a gate and a drain (or a source) in a PMOS are shorted, and may provide an identification key. The PMOS may operate based on the same principle as that of determining whether the gate and the drain (or the source) in the NMOS are shorted, and accordingly separate description is omitted herein.

Figure 7:
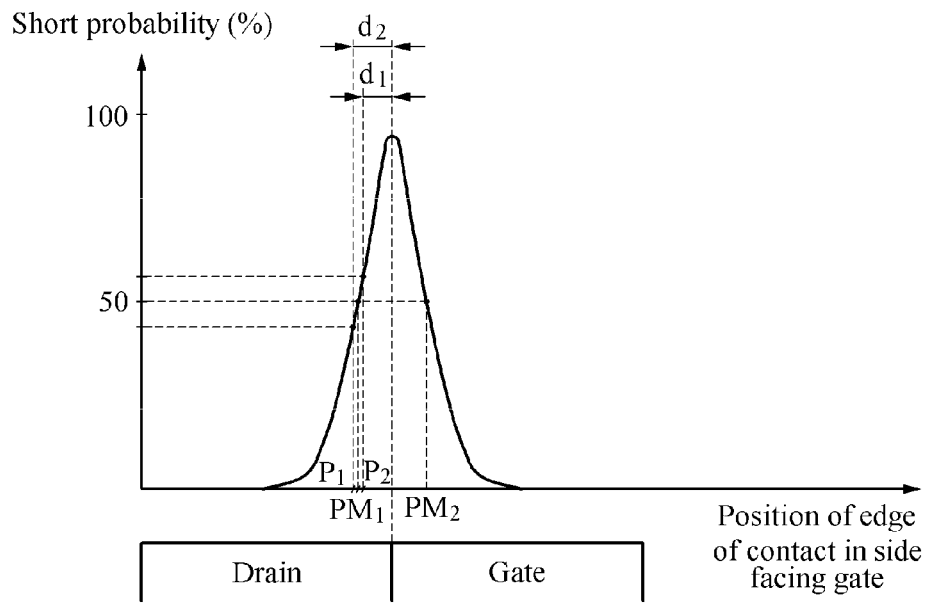
FIG. 7 is a graph illustrating a probability that a gate and a drain are shorted based on a position of an edge of a contact in a side facing the gate according to an embodiment.

FIG. 7 is a graph 700 illustrating a probability that a gate and a drain are shorted based on a position of an edge of a contact in a side facing the gate according to an embodiment.

A probability that the gate and a source are shorted may also be represented as shown in the graph illustrating the probability that the gate and the drain are shorted based on the position of the edge, and accordingly separate description is omitted herein.

A contact probability may have a maximum value when the edge is positioned in a boundary between the drain and the gate. For example, when the edge is positioned in the boundary, the contact may be formed in both two regions so as to short the drain and the gate, and accordingly the probability that the gate and the drain are shorted may be maximized.

In this example, because the probability that the gate and the drain are shorted is high enough to be close to 100%, whether the gate and the drain are shorted may not be randomly determined based on a process variation. In other words, positioning of the edge in the boundary between the drain and the gate may not be suitable for generation of a PUF.

Thus, the edge may be positioned so that a difference between a probability that the gate is shorted to the drain or the source by the contact and a probability that the gate is not shorted to the drain or the source may be equal to or less than a predetermined threshold.

The predetermined threshold may be set so that the probability that the gate and the drain are shorted may have a predetermined error based on 50%. When the probability that the gate and the drain are shorted has a value close to 50%, whether the gate and the drain are shorted may be highly likely to be randomly determined, which may be suitable for generation of a PUF.

To allow the probability that the gate and the drain are shorted to have a value close to 50%, a position of the edge may be adjusted. Ideally, positions of the edge corresponding to the probability of exactly 50% may be set to $PM_1$ and $PM_2$.

The position of the edge may most ideally correspond to the probability of 50%. However, it is difficult to position the edge so that the probability corresponds to exactly 50% when a semiconductor is actually manufactured. This is because a process error inevitably occurs above a predetermined level in a semiconductor manufacturing process, and a behavior and occurrence of the process error may be controlled within a predetermined range.

Accordingly, a threshold distance may need to be set by allowing an error of a predetermined level with the position $PM_1$ of the edge corresponding to the probability of 50% and applying the error when the semiconductor is actually manufactured.

Thus, positions $P_1$ and $P_2$ having a predetermined error range based on the probability of 50% may be set by repeating a process of manufacturing and measuring various positions of the edge. The position $P_1$ may be a position of the edge corresponding to a probability less than 50% by a predetermined error, and the position $P_2$ may be a position of the edge corresponding to a probability greater than 50% by a predetermined error.

When a distance between the position $P_1$ and the boundary between the drain and the gate is a second threshold distance $d_2$, the second threshold distance may correspond to a maximum value of a distance guaranteeing that the difference between the probability that the gate is shorted to the drain or the source and the probability that the gate is not shorted to the drain or the source is equal to or less than the threshold.

When a distance between the position $P_2$ and the boundary between the drain and the gate is a first threshold distance $d_1$, the first threshold distance $d_1$ may correspond to a minimum value of the distance guaranteeing that the difference between the probability that the gate is shorted to the drain or the source and the probability that the gate is not shorted to the drain or the source is equal to or less than the threshold.

Hence, the edge may be spaced apart from the boundary between the drain and the gate or a boundary between the gate and the source by a distance equal to or greater than the first threshold distance $d_1$ and equal to or less than the second threshold distance $d_2$.

Because the probability that the gate and the drain are shorted has a value close to 50%, randomness of whether the gate and the drain are shorted may be ensured, and thus the transistor may be used to generate a PUF.

For the position $PM_2$ of the edge corresponding to the probability of 50%, and two positions corresponding to the probability of 50% in the vicinity of the boundary between the gate and the source, a threshold distance may be set based on the same principle as that described above, and accordingly further description is omitted.

Figure 8:
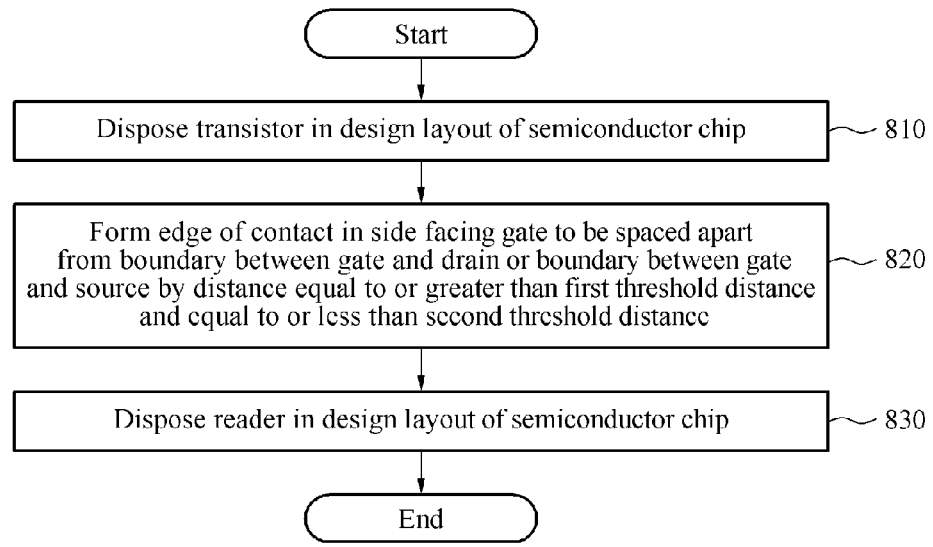
FIG. 8 is a flowchart illustrating a method of designing a device for generating an identification key according to an embodiment.

FIG. 8 is a flowchart illustrating a method of designing a device for generating an identification key according to an embodiment.

In operation 810, a transistor may be disposed in a design layout of a semiconductor chip. To design the device for generating an identification key based on whether a gate and a drain or a source in the transistor are shorted, the transistor may be preferentially disposed.

In operation 820, an edge of a contact in a side facing the gate may be formed to be spaced apart from a boundary between the gate and the drain or a boundary between the gate and the source by a distance equal to or greater than a first threshold distance and equal to or less than a second threshold distance. For example, when the edge of the contact is formed as described above, a difference between a probability that the gate and the drain (or the source) are shorted and a probability that the gate and the drain (or the source) are not shorted may be within a predetermined error range.

According to a typical design rule, forming of a contact to overlap a gate and a drain or a source may not be allowed. However, in a design of a device for generating an identification key by randomly determining whether a short circuit occurs, a contact may need to be designed to overlap a gate and a drain or a source.

Accordingly, the edge may be disposed in a different position from a position of an edge of the contact in a side facing the gate according to the typical design rule, and thus the probability that the gate and the drain or the source are shorted may be equal to or less than a predetermined threshold.

In this example, whether the gate and the drain or the source are shorted may be randomly determined by a process variation in a process of the semiconductor chip, and accordingly randomness may be ensured. Thus, the transistor may be used to generate a PUF.

In operation 830, a reader configured to determine whether the gate and the drain or the source are shorted and to generate an identification key may be disposed in the design layout of the semiconductor chip. The contact may be designed in operation 820 unlike a typical design rule that ensures that the gate and the drain are not shorted, and accordingly there is a need to identify that whether the gate and the drain or the source are shorted is randomly determined.

Thus, the reader configured to determine whether the gate and the drain or the source are shorted, to provide a result of the determining as an output value and to generate an identification key may be disposed.

By adjusting a position of the edge in the design of the device for generating an identification key, whether the gate and the drain or the source are shorted in the transistor may be randomly determined based on a process variation in a semiconductor process.

Hereinafter, a method of manufacturing a device for generating an identification key after designing the device will be described with reference to FIG. 9.

Figure 9:
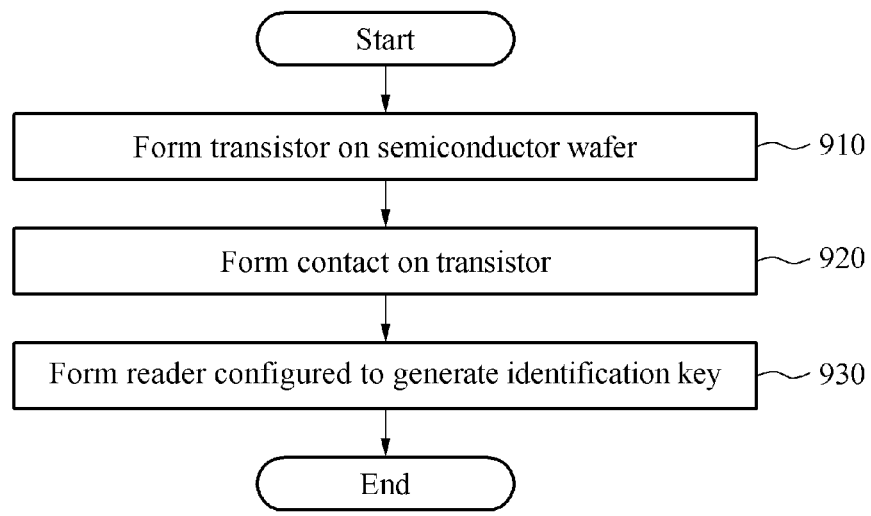
FIG. 9 is a flowchart illustrating a method of manufacturing a device for generating an identification key according to an embodiment.

FIG. 9 is a flowchart illustrating a method of manufacturing a device for generating an identification key according to an embodiment.

In operation 910, a transistor may be formed on a semiconductor wafer. An identification key may be generated based on whether a gate and a drain or a source are shorted in the transistor, and accordingly the transistor may be preferentially formed on the semiconductor wafer.

In operation 920, a contact may be formed on the transistor. The contact may be formed by a process variation in a process, and accordingly whether the gate and the drain or the source are shorted may be randomly determined.

A position of an edge of the contact in a side facing the gate may be designed to be different from a position of an edge in a side facing a gate based on a design rule, and the contact may be formed to randomly overlap the gate and the drain or the source based on the process variation.

Also, a design may be performed based on a typical design rule that ensures that a gate and a drain are not shorted, however, the contact may be formed to randomly overlap the gate and the drain or a source through a change in a process parameter in a process.

Furthermore, the edge may be disposed in a different position from a position designed in a layout of the semiconductor chip in the process so that a difference between a probability that the gate is shorted to the drain or the source by the contact and a probability that the gate is not shorted to the drain or the source is equal to a predetermined threshold.

In operation 930, a reader configured to determine whether the gate and the drain or source are shorted and to generate an identification key may be formed. The reader may determine whether the gate and the drain or source are shorted by the contact formed in operation 920, may provide a result of the determining as an output value, and may generate an identification key.

When the device for generating an identification key is actually manufactured, whether the gate and the drain or the source are shorted may be randomly determined by adjusting the position of the edge.

Figure 10:
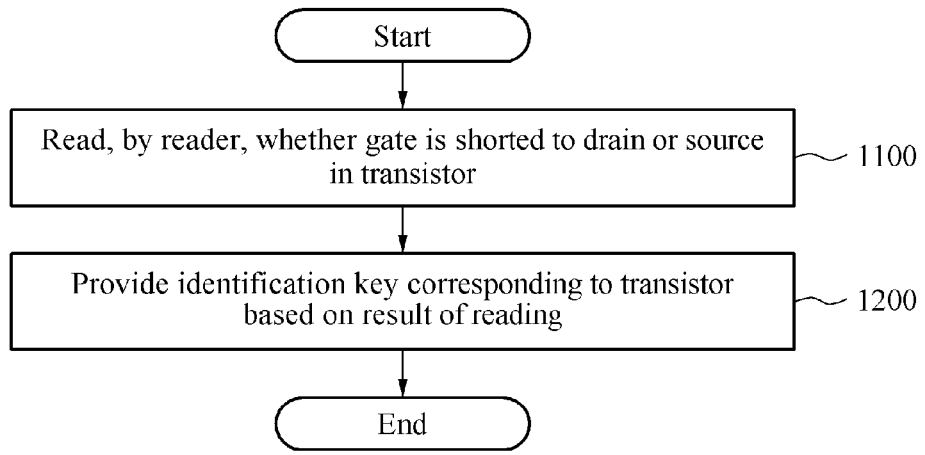
FIG. 10 is a flowchart illustrating a method of generating an identification key according to an embodiment.

FIG. 10 is a flowchart illustrating a method of generating an identification key according to an embodiment.

The method of FIG. 10 may determine whether a short circuit occurs in a transistor manufactured so that a gate is randomly shorted to a drain or a source, and may generate an identification key.

In operation 1100, a reader may read whether a gate of a transistor included in a semiconductor chip is shorted to a drain or a source by a contact. The contact may be formed on the transistor, and an edge of the contact in a side facing the gate may be positioned so that a difference between a probability that the gate is shorted to the drain or the source by the contact and a probability that the gate is not shorted to the drain or the source may be equal to or less than a predetermined threshold.

In operation 1200, an identification key corresponding to the transistor may be provided by identifying a result of the reading. Based on whether the gate is shorted to the drain or the source in the transistor, a value of "0" or "1" may be provided as an identification key. A method by which the reader provides an identification key has been described in detail with reference to FIGS. 5 and 6.

In an example, when a gate is shorted to a drain (or a source), an NMOS may operate in a saturation region, and accordingly a current may flow in the NMOS. Also, a threshold voltage may be maintained in the drain and the gate, and may be applied as an input of an inverter, and an output value may be provided through the inverter. An output value of "1" may indicate that the gate and the drain or the source are shorted, and a value of "1" may be provided as an identification key.

In another example, when the gate is not shorted to the drain (or the source), a ground bias voltage may be supplied to the gate, and accordingly the NMOS may not operate. In other words, a current may not flow, which may be used to determine whether a short circuit occurs.

Because the current does not flow, a voltage of the drain may be applied as an input of the inverter, and an output value may be provided through the inverter. An output value of "0" may indicate that the gate and the drain or the source are not shorted, and a value of "0" may be provided as an identification key.

The units described herein may be implemented using hardware components, software components, and/or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A device for generating an identification key, the device comprising: a transistor included in a semiconductor chip;
a contact formed on the transistor, an edge of the contact in a side facing a gate of the transistor being positioned so that a first probability that the gate is shorted to a drain or a source by the contact and a second probability that the gate is not shorted to the drain or the source occur, and a difference between the first probability and second probability is equal to or less than a predetermined threshold; and a reader configured to determine whether the gate is shorted to the drain or the source by the contact and to generate an output value based on the determination of the reader, the output value used to generate an identification key.

2. The device of claim 1, wherein a position of the edge is different from a position of an edge in a side facing a gate based on a design rule that ensures that the gate is not shorted to the drain or the source by the contact.

3. The device of claim 1, wherein whether the gate is shorted to the drain or the source is randomly determined based on a process variation in a process of manufacturing the semiconductor chip.

4. The device of claim 1, wherein the edge is spaced apart from a boundary between the gate and the drain or a boundary between the gate and the source by a distance equal to or greater than a first threshold distance and equal to or less than a second threshold distance.

5. The device of claim 4, wherein the first threshold distance corresponds to a minimum value of a distance guaranteeing that the difference between the probability that the gate is shorted to the drain or the source and the probability that the gate is not shorted to the drain or the source is equal to or less than the threshold, and
wherein the second threshold distance corresponds to a maximum value of the distance guaranteeing that the difference between the probability that the gate is shorted to the drain or the source and the probability that the gate is not shorted to the drain or the source is equal to or less than the threshold.

6. The device of claim 1, wherein the edge is in a different position from a position designed in a layout of the semiconductor chip so that the difference between the probability that the gate is shorted to the drain or the source by the contact and the probability that the gate is not shorted to the drain or the source is equal to or less than the predetermined threshold.

7. A method of designing a device for generating an identification key, the method comprising: disposing a transistor in a design layout of a semiconductor chip; disposing a contact in the layout, the contact being formed on the transistor, and an edge of the contact in a side facing a gate of the transistor being positioned so that a first probability that the gate is shorted to a drain or a source by the contact and a second probability that the gate is not shorted to the drain or the source occur, and a difference between the first probability and second probability is equal to or less than a predetermined threshold; and disposing a reader in the layout, the reader being configured to determine whether the gate is shorted to the drain or the source by the contact and to generate an output value based on the determination of the reader, the output value used to generate an identification key.

8. The method of claim 7, wherein a position of the edge is different from a position of an edge in a side facing a gate based on a design rule that ensures that the gate is not shorted to the drain or the source by the contact.

9. The method of claim 7, wherein whether the gate is shorted to the drain or the source is randomly determined based on a process variation in a process of manufacturing the semiconductor chip based on the layout.

10. A method of manufacturing a device for generating an identification key, the method comprising: forming a transistor on a semiconductor wafer; forming a contact on the transistor, an edge of the contact in a side facing a gate of the transistor being positioned so that a first probability that the gate is shorted to a drain or a source by the contact and a second probability that the gate is not shorted to the drain or the source occur, and a difference between the first probability and second probability is equal to or less than a predetermined threshold; and forming a reader, the reader being configured to determine whether the gate is shorted to the drain or the source by the contact and to generate an output value based on the determination of the reader, the output value used to generate an identification key.

11. The method of claim 10, wherein a position of the edge is different from a position of an edge in a side facing a gate based on a design rule that ensures that the gate is not shorted to the drain or the source by the contact.

12. The method of claim 10, wherein the forming of the contact comprises disposing the contact in a different position from a position designed in a layout of a semiconductor chip so that the difference between the probability that the gate is shorted to the drain or the source by the contact and the probability that the gate is not shorted to the drain or the source is equal to or less than the predetermined threshold.

13. The method of claim 10, wherein whether the gate is shorted to the drain or the source is randomly determined based on a process variation in a process of manufacturing a semiconductor chip.

* * * * *